United States Patent [19]
Dufft et al.

[11] 4,289,358
[45] Sep. 15, 1981

[54] VEHICLE BRAKING SYSTEMS

[75] Inventors: Jurgen Dufft; Malcolm Brearley, both of Tyseley, England

[73] Assignee: Girling Limited, Birmingham, England

[21] Appl. No.: 19,153

[22] Filed: Mar. 8, 1979

[30] Foreign Application Priority Data

Mar. 8, 1978 [GB] United Kingdom ............... 9253/78

[51] Int. Cl.$^3$ .............................................. B60T 8/18
[52] U.S. Cl. ................................. 303/22 R; 303/100
[58] Field of Search ............... 303/22 R, 22 A, 6 C, 303/100, 91, 104; 244/111; 251/134; 318/160, 475, 685

[56] References Cited

U.S. PATENT DOCUMENTS

| | | | |
|---|---|---|---|
| 3,488,030 | 1/1970 | Hulme et al. | 251/134 |
| 3,630,578 | 12/1971 | Kaiser | 303/100 |
| 3,703,946 | 11/1972 | Ondrasik | 303/95 X |
| 3,839,662 | 10/1974 | N'Guyen Van | 251/134 X |

FOREIGN PATENT DOCUMENTS

475118  8/1969  Switzerland ..................... 303/22 R

*Primary Examiner*—J. D. Miller
*Assistant Examiner*—Reinhard J. Eisenzopf
*Attorney, Agent, or Firm*—Scrivener, Clarke, Scrivener and Johnson

[57] ABSTRACT

An arrangement for varying a pre-load on a control valve of a vehicle braking system in dependence upon vehicle loading includes a low frequency vibration sensor or an accelerometer for sensing the oscillation frequency of a sprung part of the vehicle and providing an output signal, preferably an electrical signal, indicative of the frequency, a signal processing circuit for processing the signal, the circuit including a filter which filters components of the signal which are not indicative of a frequency within the normal oscillation frequency range, and an arrangement for altering the pre-load in dependence upon the processed signal.

19 Claims, 5 Drawing Figures

VEHICLE BRAKING SYSTEMS

This invention relates generally to vehicle braking systems and particularly to an arrangement for varying a pre-load on a control valve in such a system in dependence upon vehicle loading.

Braking systems commonly have a fluid pressure source in the form of a pedal-operated master cylinder which supplies pressure directly to the front wheel brakes and through a brake pressure control valve to the rear wheel brakes. The control valve may be a pressure reducing valve which, when a predetermined "cut-in" pressure has been attained, limits the pressure supplied to the rear wheel brakes as compared to that supplied to the front wheel brakes to reduce the risk of rear wheel lock. The valve may optionally be a pressure limiting valve which prevents any increase in pressure at the rear wheel brakes after the cut-in pressure has been attained.

Commonly, the cut-in pressure of the control valve is variable in dependence upon vehicle loading and in known systems a control valve member, which is movable to open and close the valve, is subjected to a pre-load which varies in dependence upon vehicle loading, the cut-in pressure being dependent upon the pre-load. The pre-load is usually applied by a mechanical linkage which is connected between the sprung and unsprung parts of the vehicle and senses the deflections between the vehicle parts. The pre-load applied to the control valve member is dependent upon the sensed deflections.

On assembly of the vehicle, the control valve and linkage are set to provide a desired pre-load for a given vehicle load. Such valves and linkages have the disadvantage that during use the vehicle suspension settles which requires that the valve and linkage has to be frequently reset to compensate for settling. Furthermore, during extreme vehicle deflections there is the possibility of over-travel damage and excessive loading in the linkage system which necessitates the use of complex lost motion and over-travel mechanisms. Also the linkages have to be sufficiently robust to withstand transient suspension loads.

The present invention aims to overcome the above disadvantages and provides an arrangement for varying a pre-load on a control valve of a vehicle braking system in dependence upon vehicle loading, comprising sensing means for sensing the oscillation frequency of a sprung part of the vehicle and providing an output signal, indicative of said frequency, pre-loading means for applying a load to said control valve, signal processing means for processing said signal, and means for altering said load in dependence upon the processed signal.

In the presently preferred embodiment of the invention described in more detail below, the sensing means comprises a low frequency vibration sensor or an accelerometer for connection to the sprung part of the vehicle, the sensing means passing an electrical signal to a controlled gain amplifier which rejects undesirable background noise and low pass filter means which filters out those oscillations that are not caused by non-transient changes in vehicle loading. An output control means is associated with the controlled gain amplifier and the low pass filter and transmits the processed signal to the means for altering the valve loading which varies the load on the valve in response to the signal derived from the output control means.

A vehicle braking system incorporating a preload applying arrangement in accordance with the invention will now be described by way of example with reference to the accompanying drawings, in which.

Figure 1:
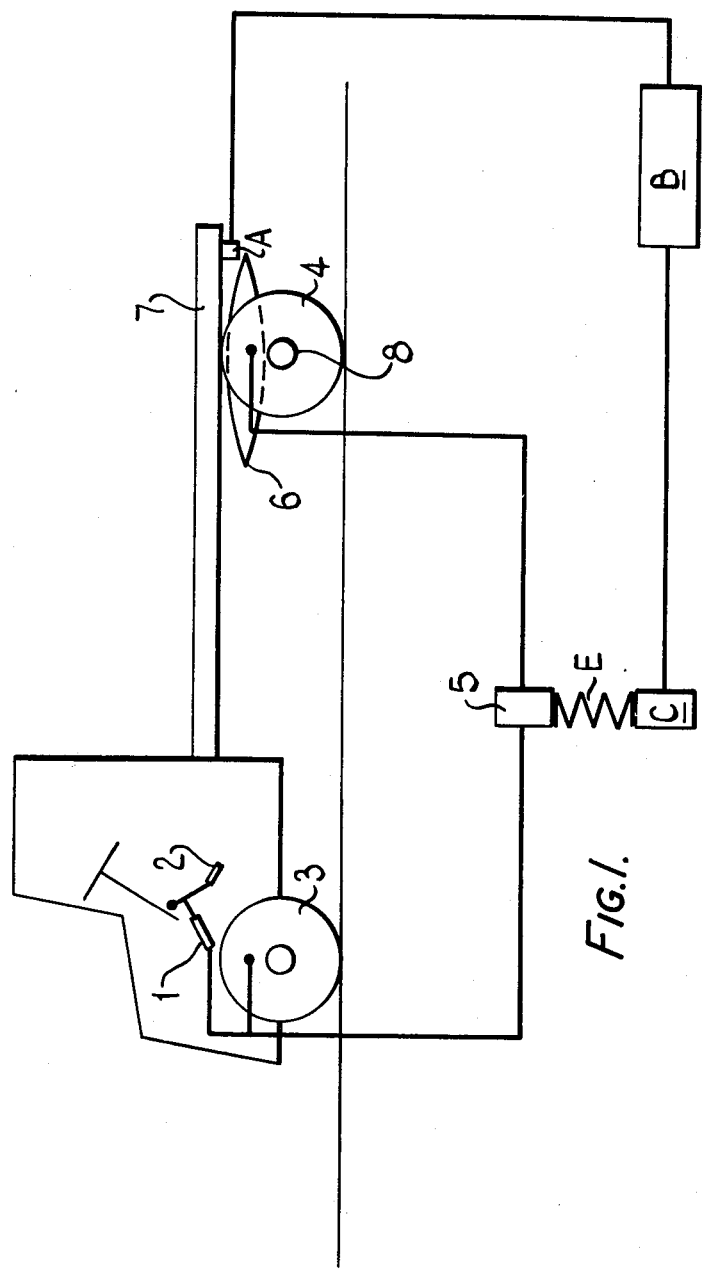
FIG. 1 is a diagrammatic representation of the vehicle and its braking system.

Briefly, the braking system comprises a master cylinder 1 operable by a pedal 2 to apply pressure fluid directly to the brake cylinders of the front wheels 3 and indirectly to the brake cylinders of the rear wheels 4 through the intermediary of a control valve 5 which may be a pressure proportioning valve or a pressure limiting valve.

The vehicle comprises a suspension spring 6 which is mounted between the sprung part 7 of the vehicle, which is the main chassis member, and the vehicle axle, which is the unsprung part 8.

The vehicle, and in particular a commercial vehicle which has a large weight, can be simply represented by a weight suspended from a spring. The frequency of oscillation of such a suspended weight is constant for a given value of the weight, but if the weight changes then so does the oscillation frequency, the frequency varying inversely with the weight. As applied to a vehicle, the frequency value is analogous to the vehicle or wheel load and in the present embodiment is used to provide a signal by which the load on the control valve can be varied independently of suspension deflection or transient movements.

Figure 2:
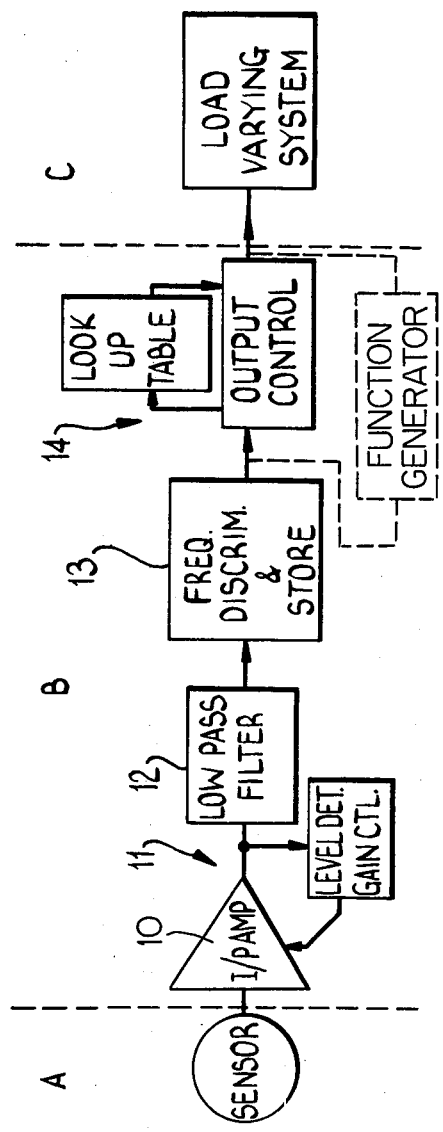
FIG. 2 is a diagram of a signal processing circuit of the arrangement.

The pre-load applying arrangement comprises a low frequency vibration transducer A or accelerometer connected to the sprung part 7 of the vehicle, the transducer A sensing vehicle oscillations and passing an electrical signal to an electronic processor B illustrated in FIG. 2. The processed signal from processor B is passed to one of the load-altering systems C illustrated in FIG. 3.

The input electrical signal from the transducer A is important in the low frequency content and is amplified by an adaptive gain input amplifier 10 arranged to be capable of rejecting a given level of background noise, for example due to engine vibration, yet responding to transient bounce signals generated from vehicle movement over normal surfaces. The amplified signal is heavily filtered by a low pass filter 12 to provide only the content of the input signal within the normal vehicle bounce frequency range, typically 0.4 to 10 hz. This signal is discontinuous, appearing only under transient conditions and is analysed in a frequency discriminator 13 whenever the amplitude provided by the adaptive gain amplifier 11 and filter 12 combination is within a range predetermined for the particular vehicle.

The assessed frequency measurement is stored in an electronic memory, preferably though not necessarily of digital form, in order to provide a reference signal to be used for selection of the valve pre-load during any quiescent periods when no input signal can be detected, i.e. under non-transient conditions.

When the vehicle is started, but before the vehicle moves from rest, static conditions obtain and deny the arrangement any signal for processing. Under these conditions an initialisation sequence is performed automatically, to generate a preset reference level to be used to adjust the valve pre-load until the vehicle moves and generates an oscillation signal which can be processed to override the temporary reference. The discriminator 13 output signal provides the control input for a correlation system 14, preset to generate a given output demand to the valve position control C for any input frequency detected within the range predetermined for that vehicle. The correlation system 14 may comprise a look-up table in memory for a digital system or a function generator (shown in broken lines in FIG. 2) comprising non-linear elements for an analogue system. The look-up table or function generator determine the desired valve pre-load for the sensed frequency oscillation and provide a discontinuous and changing output or "demand" signal indicative of the required pre-load. The demand signal is fed to the load altering system (FIG. 3) which translates the demand into a form suitable for driving the appropriate valve position control loop. The demand signal may be constrained by suitable cut-off means (not shown) to change only below predetermined vehicle speeds, or alternatively only at spaced time intervals, which are preferably widely spaced, for example 10 minutes, but based on the integrated difference in signal between the demand signal at the start of a time interval and the demand signal at the end of said time interval.

Figure 3:
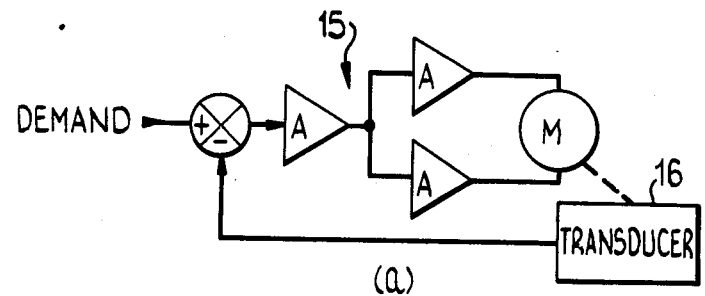
FIGS. 3a to 3c are diagrams of different forms of systems for altering the pre-load.
Figure 3:
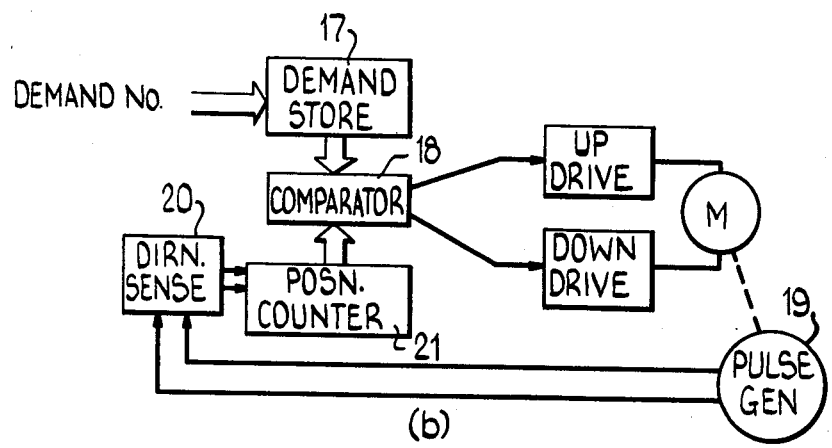
Figure 3:
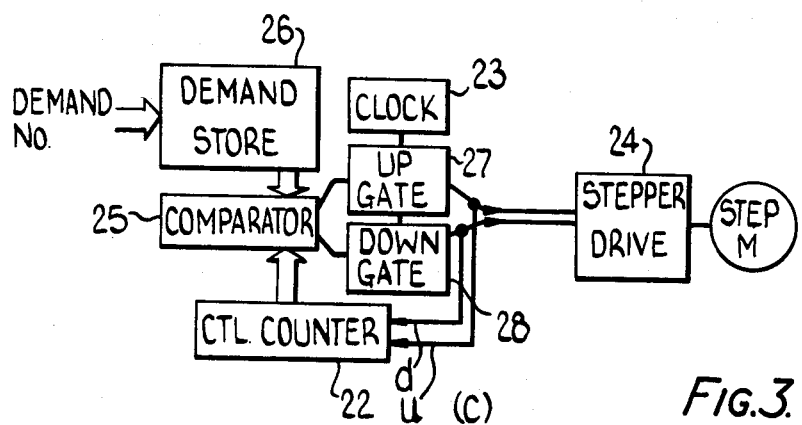

Three examples of load-altering systems are shown in FIG. 3 and incorporate a motor drive circuit capable of bi-directional control preferably with a three position, UP, OFF, DOWN, action. The motor M is coupled to the control valve 5 by a variable force-applying means, preferably in the form of a spring E (FIG. 1), and either compresses or expands the spring E to thereby vary the load on the control valve 5.

The system of FIG. 3a has a d.c. positioning loop in which the motor M drives the spring means E and is switched off when the required position is reached. The system comprises a motor drive amplifier arrangement 15 and a feedback transducer 16 which detects the motor drive position. The feedback transducer 16 may be a potentiometer which produces a voltage which becomes equal to the demand voltage, i.e. the output signal from the correlation system 14 when the desired position is reached. Under these conditions the error is zero and the motor drive amplifier arrangement 15 is de-energised.

The system of FIG. 3b has a digital system more appropriate to the look-up table means of correlation. The demand signal is a digital number which enters a store 17 and thereafter a comparator 18 which produces an error drive signal to move the motor M in a suitable direction to approach the required position. The movement is detected by a pulse generator 19 the output of which is connected to a direction sensor 20 and through a position counter 21 to the comparator 18. The pulse generator 19 causes contents of the position counter 21 to approach the demand number. The comparator 18 senses equality and terminates the drive when the required position is reached.

FIG. 3c illustrates a system having a stepping motor M in which a control or position counter 22 detects clock pulses from a clock 23, the pulses being routed to a step drive logic unit 24. A comparator 25 tests for equality between the counter 22 and a demand position store 26. An unequal comparator input condition leads to the opening of an up or down drive gate 27,28 as appropriate to the error and the pulses which are passed are used to drive both the stepping motor M and control counter 22 unitl the required position is reached.

It will be appreciated that many variations and modifications of the above described system are possible. For example, cut-off means (not shown) may be incorporated in the load-altering system C, instead of the correlation system as described above, to ensure operation of the motor only below a predetermined vehicle speed, or at spaced time intervals.

We claim:

1. An arrangement for varying a preload on a control valve of a vehicle braking system in dependence upon vehicle loading, including sensing means on the sprung part of a vehicle for sensing the oscillation frequency of the sprung part of the vehicle while in motion and means for changing said pre-load in dependence upon said sensed oscillation frequency.

2. An arrangement according to claim 1, wherein in that said sensing means (A) is arranged to provide an output signal indicative of said frequency, and said means for changing said pre-load includes pre-loading means for applying a load to said control valve, signal processing means for processing said signal, and means for altering said pre-load in dependence upon the processed signal.

3. An arrangement according to claim 2, wherein said sensing means comprises a low frequency vibration sensor.

4. An arrangement according to claim 2, wherein said sensing means comprises an accelerometer.

5. An arrangement according to claim 4, wherein said processing means includes noise-rejecting means between said sensing means (A) and said filter means for rejecting undesirable background noise.

6. An arrangement according to claim 5, wherein said noise-rejecting means includes an adaptive gain amplifier.

7. An arrangement according to claim 2, wherein said output signal is an electrical signal, and wherein said processing means includes a filter means which filters the components of said signal which are not indicative of a frequency within the normal vehicle oscillation frequency range.

8. An arrangement according to claim 7, wherein said filter means permits passage of signals indicative of an oscillation frequency of from 0.4 to 10 hz.

9. An arrangement according to claim 2, wherein said processing means includes a correlation system which generates said processed signal when a signal input into said correlation system is indicative of a frequency oscillation within a predetermined range for said vehicle.

10. An arrangement according to claim 9 wherein said correlation system includes a look-up table.

11. An arrangement according to claim 9, wherein said correlation system comprises a function generator having non-linear elements.

12. An arrangement according to claim 2, wherein said means for altering said load comprises a motor.

13. An arrangement according to claim 12, wherein in that said motor is incorporated in a loop circuit having a feedback transducer, the drive of the motor being stopped when a feedback signal from said transducer is equal to processed signal.

14. An arrangement according to claim 13, wherein said feedback transducer is a potentiometer connected between said motor and a line carrying said processed signal.

15. An arrangement according to claim 14, wherein said means for altering the load includes a clock which provides pulsed signals, and a control counter which receives signals from said clock, and wherein said motor has a stepped drive which receives pulsed signals from said clock, said control counter feeding a signal indicative of said counter pulses to said comparator, and said comparator actuating said stepped drive in dependence upon said processed signal and said signal from said control counter.

16. An arrangement according to claim 12, wherein said means for altering said load includes means providing a signal indicative of the position of said motor, and a comparator which compares said processed signal with said signal indicative of the position of said motor said comparator being operable to actuate said motor when said compared signals are unequal.

17. An arrangement according to claim 16, wherein said means providing a signal indicative of the position of said motor is a pulse generator.

18. An arrangement according to claim 17, including a position counter, wherein said pulse generator actuates a position counter which provides said comparator with the signal indicative of the motor position.

19. An arrangement according to claim 12, wherein said motor is coupled to said pre-loading means connected to said valve, and wherein said pre-loading means is a spring.

* * * * *